(12) United States Patent
Lorch et al.

(10) Patent No.: US 8,966,063 B2
(45) Date of Patent: Feb. 24, 2015

(54) OPERATING A SLEEP MANAGEMENT SERVICE

(75) Inventors: Jacob R. Lorch, Bellevue, WA (US);
Jitendra Padhye, Redmond, WA (US);
Brian Zill, Bellevue, WA (US);
Wenbiao Xing, Bellevue, WA (US); Wei Wan, Redmond, WA (US); Li Chen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 13/366,387

(22) Filed: Feb. 6, 2012

(65) Prior Publication Data
US 2013/0205152 A1 Aug. 8, 2013

(51) Int. Cl.
*G06F 15/173* (2006.01)

(52) U.S. Cl.
USPC .......................................................... 709/224

(58) Field of Classification Search
None
See application file for complete search history.

(56) References Cited

U.S. PATENT DOCUMENTS

| | | | |
|---|---|---|---|
| 7,757,108 B2 * | 7/2010 | Cheshire | 713/320 |
| 8,095,814 B2 * | 1/2012 | O'Connell et al. | 713/323 |
| 2006/0136562 A1 * | 6/2006 | Tung | 709/208 |
| 2006/0197660 A1 * | 9/2006 | Luebke et al. | 340/539.26 |
| 2007/0067445 A1 * | 3/2007 | Vugenfirer et al. | 709/224 |
| 2008/0064407 A1 * | 3/2008 | Miller | 455/442 |
| 2008/0098241 A1 * | 4/2008 | Cheshire | 713/300 |
| 2009/0083560 A1 * | 3/2009 | O'Connell et al. | 713/323 |
| 2009/0097428 A1 | 4/2009 | Kneckt et al. | |
| 2009/0196211 A1 | 8/2009 | Wentink | |
| 2010/0165896 A1 | 7/2010 | Gong et al. | |
| 2011/0019601 A1 | 1/2011 | Li et al. | |
| 2011/0142041 A1 * | 6/2011 | Imai | 370/389 |
| 2011/0191610 A1 | 8/2011 | Agarwal et al. | |

OTHER PUBLICATIONS

Leung, et al., "Community-based asynchronous wakeup protocol for wireless peer-to-peer file sharing networks", Retrieved at <<http://ieeexplore.ieee.org/stamp/stamp.jsp?tp=&arnumber=1541014>>, Proceedings of The Second Annual International Conference on Mobile and Ubiquitous Systems: Networking and Services, Jul. 17-21, 2005, pp. 342-350.

Schiele, "Energy-Efficient Cluster-based Service Discovery for Ubiquitous Computing", Retrieved at <<http://becker.bwl.uni-mannheim.de/fileadmin/files/Research/SIGOPSEW04.pdf>>, Proceedings of the 11th workshop on ACM SIGOPS European workshop, Sep. 2009, pp. 5.

* cited by examiner

*Primary Examiner* — Ninos Donabed
(74) *Attorney, Agent, or Firm* — Steve Wight; Raghu Chinagudabha; Micky Minhas

(57) ABSTRACT

The claimed subject matter provides a method for operating a sleep management service. The method include identifying a set of guardians based on a local state for each of a plurality of compute nodes. The method also includes sending a wake request to all sleeping compute nodes in the identified set. The method further includes sending a request to become a guardian to all compute nodes in the identified set. Additionally, the method includes stopping a current guardian from being a guardian if the current guardian is less suitable than a threshold number of current guardians.

19 Claims, 5 Drawing Sheets

300

OPERATING A SLEEP MANAGEMENT SERVICE

BACKGROUND

Collectively, computers in enterprise environments use a lot of energy by remaining on when idle. By putting these machines to sleep, large enterprises can achieve significant cost savings. In cloud service environments, for example, some threshold number of servers may be kept awake to provide cloud services. While some servers may be permitted to sleep, their availability is maintained in case of increased demand for services. In desktop environments, many operating systems (OSes) put a desktop machine to sleep after some amount of user idle time, but users and IT administrators typically override this to enable remote access. Remote access is typically used to remotely access files or other resources on the desktop. IT administrators may use remote access to access other desktops to perform maintenance tasks. Thus, any system for putting machines to sleep also attempts to maintain their availability for remote access.

There are a number of approaches for achieving the power savings of sleeping machines while maintaining their availability. However, many of the approaches are challenging to implement. Some approaches use specialized hardware. Others use a fully virtualized desktop, or application stubs, which implicate further technological challenges.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method for operating a sleep management service. The method includes identifying a set of guardians based on a local state for each of a plurality of compute nodes. The method also includes sending a wake request to all sleeping compute nodes in the identified set. The method further includes sending a request to become a guardian to all compute nodes in the identified set. Additionally, the method includes stopping a current guardian from being a guardian if the current guardian is less suitable than a threshold number of current guardians.

Another exemplary embodiment of the subject innovation provides a system for operating a sleep management service. The system includes a processing unit and a system memory. The system memory includes code configured to direct the processing unit to manage a sleeping compute node. The sleeping compute node is on a subnet of compute nodes. The processing unit is also directed to add a custom route to the manager that directs traffic destined for the sleeping compute node to a gateway router. Additionally, the processing unit is directed to receive, at the current manager, traffic sent from the current manager to the sleeping compute node.

Another exemplary embodiment of the subject innovation provides a computer-readable medium that includes code to direct the operation of a processing unit. The code may direct the processing unit to identify a set of guardians based on a local state for each of a plurality of compute nodes in a subnet. A wake request is sent to all sleeping compute nodes in the identified set. A request to become a guardian is sent to all compute nodes in the identified set. A current guardian is stopped from being a guardian if the current guardian is less suitable than a threshold number of current guardians. The code may also direct the processing unit to manage a sleeping compute node on the subnet. A custom route is added to the manager; this route directs traffic destined for the sleeping compute node to a gateway router. Traffic sent from the manager to the sleeping compute node is received at the manager.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
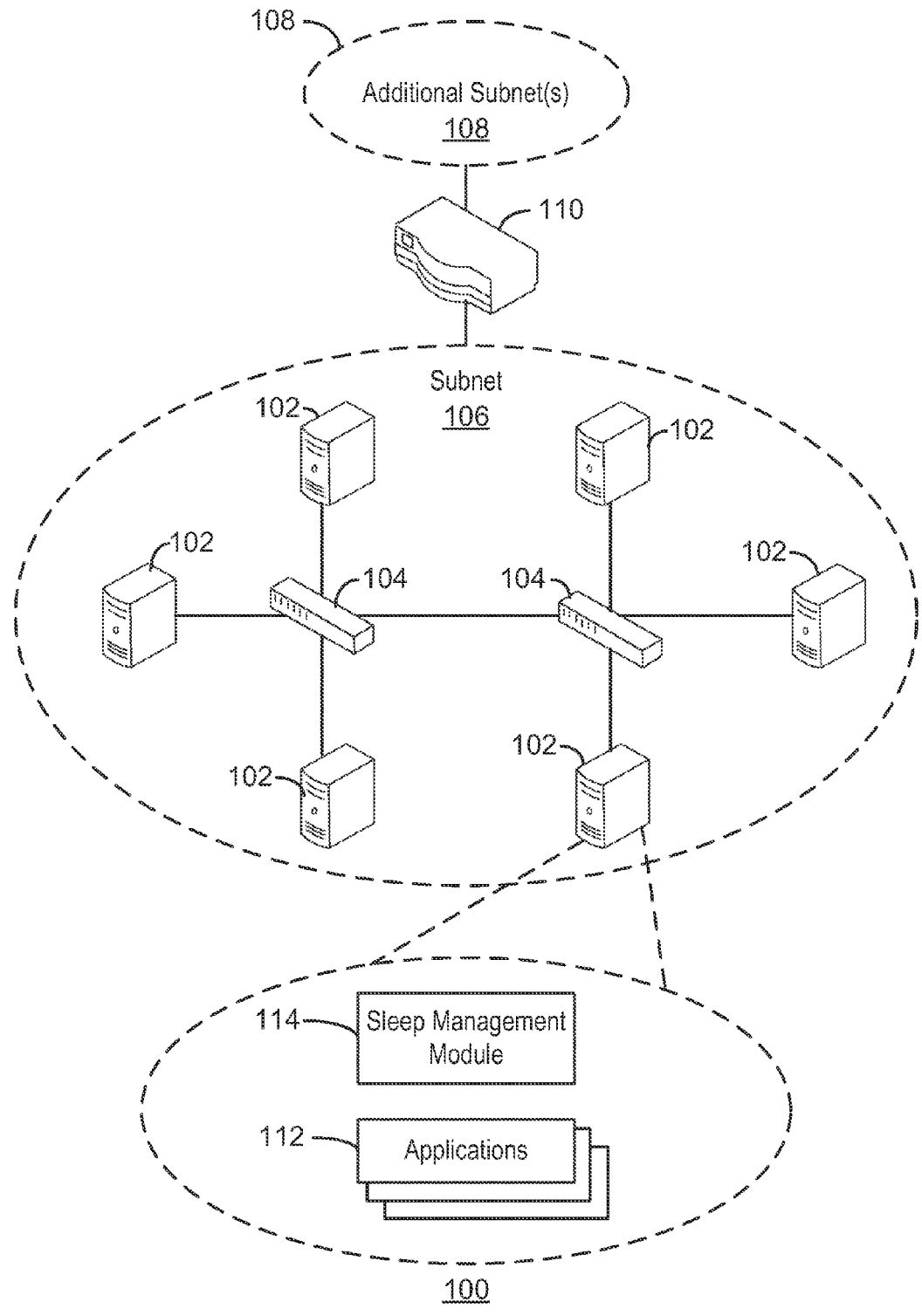
FIG. 1 is a block diagram of a system for a sleep management service in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "manipulator" and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media. Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Some approaches to sleep management use a dedicated sleep proxy. The sleep proxy may be implemented on a server, and direct traffic meant for a sleeping computer to a manager. However, a dedicated sleep proxy increases network costs. Further, such a proxy is a single point of failure. As such, additional proxies may be used, further adding to the costs.

In embodiments of the claimed subject matter, a sleep management system maintains a specified threshold of awake computing devices (or "nodes") within a network to manage other, sleeping nodes in the network. Advantageously, by configuring the nodes of the system to manage each other, embodiments provide a decentralized system without the deployment and administration costs of one or more dedicated sleep proxies.

FIG. 1 is a block diagram of a system 100 for a sleep management service in accordance with the claimed subject matter. The system 100 includes a logical grouping of multiple nodes 102(1), 102(2), . . . , 102(N) interconnected by one or more switches 104(1), . . . , 104(M), which route traffic to the individual nodes 102(1)-(N). The logical grouping of nodes 102(1)-(N) may comprise a subnetwork (or "subnet") 106, although other implementations may employ the described techniques in other logical groupings. In one embodiment, the nodes 102 of the subnet may provide a service, e.g., a cloud service.

Further, while FIG. 1 illustrates the nodes 102(1)-(N) uniformly, these nodes 102(1)-(N) may comprise desktop computers, servers, laptop computers, or other suitable computing devices. Further, the subnet 106 couples to one or more additional subnets 108 via a router 110. While a single router 110 is shown, the subnet 106 may couple to multiple routers in other implementations.

The nodes 102 include applications 112, and a sleep management module 114. The applications 112 may include applications or services available for use by computers within and outside of the subnet 106. For example, the applications 112 may support a cloud service provided by the nodes 102 in the subnet 106.

As referred to herein, nodes 102 that are sleeping may be in a sleep state, a hibernate state, or any other state in which another node 102 may cause the sleeping node to enter a fully-usable state, such as the S0 power state. In one embodiment, the nodes 102 may include inactivity timers (not shown) that put the nodes 102 to sleep.

The nodes 102 may represent a proxy, a manager, or a guardian. A proxy is a server capable of managing a sleeping node. A manager is a proxy that is currently managing a sleeping node. A guardian is a proxy that does not go to sleep. In one embodiment, the proxy may become a guardian by disabling the inactivity timer.

The sleep management module 114 enables the system 100 to maintain at least a specified threshold of awake nodes 102 within the subnet 106. The sleep management module 114 may further enable a specified set of guardians to remain awake to manage sleeping nodes within the subnet 106. In this way, the guardians maintain a threshold number of proxies that are not in sleep mode. The guardians may be nodes 102 selected to stay awake and manage the sleeping nodes. In one embodiment, the guardians may be nodes with their inactivity timers turned off. Managing a node 102 includes inspecting traffic for, and answering simple requests on behalf of, a sleeping node. The managers also awaken the sleeping nodes in response to valid service requests for the sleeping nodes. For example, a manager awakens a sleeping node when a TCP SYN arrives.

The nodes 102 may host the applications 112 at respective transmission control protocol (TCP) ports. The sleep management module 114 enables the node 102 to go to sleep, yet remain available if another node 102 tries to connect. For example, the sleep management module 114 keeps track of the TCP ports that host the applications 112 (e.g., the ports that the node 102(5) has open) as a part of its local state, and broadcasts this local state to the other nodes 102 within the subnet 106. When a proxy on the subnet, e.g., node 102(4), discovers that the node 102(5) has gone to sleep, the node 102(4) begins to manage the sleeping node 102(5) by watching for connection attempts on those ports. If the manager sees a request for a service on an open port of the sleeping node 102(5), the manager wakes the sleeping node 102(5).

In one embodiment, the sleep management module 114 ensures each node 102 has a global view of the set of available nodes 102 (awake and asleep), and a specified threshold for the number of awake nodes. This global view can have some staleness and inconsistency. In such an embodiment, each awake node broadcasts its information to all nodes 102 on the subnet periodically, e.g., every five minutes. When a node 102 is asleep, another node 102, e.g., the manager, takes over this periodic broadcast on its behalf.

In addition to periodically broadcasting this global data, the proxies may also update the current set of guardians. This may be done when there are nodes 102 more suitable to be guardians than one or more of the current set of guardians. For example, a node 102 that is playing media may be more suitable to be a guardian than a node 102 that is sitting idle. Moreover, suitability of a proxy may be determined in part based on whether a proxy is currently performing a task that prohibits it from sleeping, such as playing media. The subject innovation advantageously uses as guardians the proxies for which power savings cannot be obtained by putting them to sleep because the proxies are engaged in an activity that prohibits sleeping.

Figure 2:
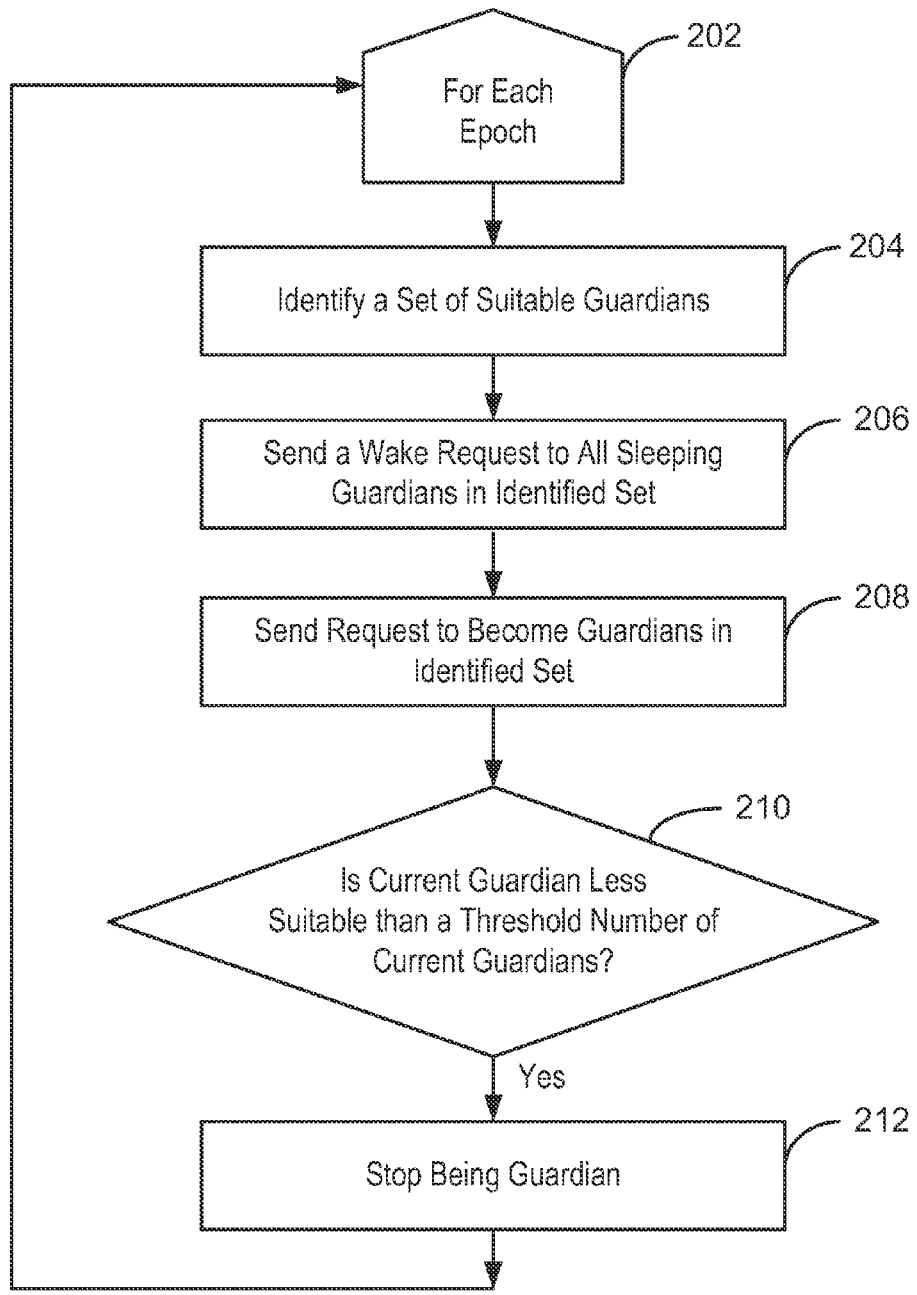
FIG. 2 is a process flow diagram of a method for operating a sleep management service in accordance with the claimed subject matter.

FIG. 2 is a process flow diagram of a method 200 for operating a sleep management service in accordance with the claimed subject matter. It should be understood that the process flow diagram is not intended to indicate a particular order of execution. In one embodiment, the sleep management module 114 of each guardian may perform the method 200. In such an embodiment, when a node 102 becomes available, e.g., wakes from sleep mode, the node 102 becomes a guardian. The guardian may perform the method 200 in periodic epochs of a specific time length, p. The time period, p, may be represented as shown in Equations 1-3:

$$p > 2 \cdot \text{TypicalMessageTime} \quad (1)$$

$$p \leq \text{DeliveryPeriod} \quad (2)$$

$$p < \text{FailurePeriod} - \text{WorstCaseDeliveryTime}. \quad (3)$$

Each epoch begins at a time that is a multiple of p. Thus, an epoch may be represented as a function, where Epoch(t)= [t/p], represents the epoch number to which t belongs.

Let TypicalMessageTime be an amount of time that typically exceeds message delivery time. Let FailurePeriod be a period of time during which no more than f will simultaneously fail. By the assumption of limited failure correlation, there exists such a time and number known to all servers. In one embodiment, becoming unavailable due to sleeping after inactivity timeouts is treated as a failure.

Let (t) be the number of servers used to provide service at time t. However, more nodes 102 than this may be used to defend against simultaneous node failures. As such, the system 100 may generally try to keep q(t)+f nodes awake. With this number of awake nodes, even if there are f failures there still may be q(t) available. If there is any underage, the awake nodes 102 detect this condition and correct it by waking more servers. As long as this detection and waking process takes less than FailurePeriod, at least q(t) nodes 102 remain available.

The method 200 begins at block 202. The blocks 202-212 may be repeated for each epoch. At block 204, the sleep management module 114 may identify a set of suitable guardians. The number of identified guardians may be a specified threshold, such as q(t)+f, where q(t) may represent the number of nodes 102 used to provide a cloud service. The guardians may be identified based on the local states of all the nodes 102 in the subnet. In one embodiment, the suitability may be a numeric value calculated based on the number of outstanding requests to keep the machine awake, the time the inactivity timer will fire and thereby put the machine to sleep, the typical idle power consumption of the machine, and other factors.

For example, each node 102 may keep track of the following variables: CurrentSuitability, the suitability of the node to be a guardian; CurrentTime, the current local time; CurrentQuorumSize, the local estimate of q(CurrentTime); MoreSuitableSet, the set of more-suitable guardians the node has heard from in a particular epoch; and AmIMoreSuitable, a boolean indicating whether the current node 102 has sent a message to another node 102 during this epoch indicating the current node is more suitable to be a guardian than the other node 102. At the beginning of each epoch, if the node 102 is a guardian, the node 102 initializes MoreSuitableSet to an empty set. The Boolean, AmIMoreSuitable, is set to False. The identified nodes 102 may be represented in an array, BestServers.

At block 206, the sleep management module 114 may send a wake request to all nodes 102 in the set of selected guardians that are asleep. For example, the guardian may initiate the process of waking each node, MO, in BestServers, that the current node considers unavailable.

At block 208, the sleep management module 114 may send a request to become a guardian to each node 102 in the identified set. For each server, MO, in BestServers, the guardian sends a message, e.g., BecomeGuardian, that specifies the Epoch(CurrentTime) and the guardian's CurrentSuitability.

When nodes 102 receive BecomeGuardian messages, the nodes 102 receiving the messages become guardians. The new guardians, i.e., the nodes 102 receiving the BecomeGuardian messages, may also send acknowledgement messages to the original guardian. The original guardian is the node 102 sending the BecomeGuardian messages. The acknowledgement message may specify whether the new guardian is more suitable to be a guardian than the original guardian. In one embodiment, the new guardians may compute a Boolean, MoreSuitable, determined by comparing the CurrentSuitability of the new guardian against that of the original guardian. If MoreSuitable is True, the variable, AmIMoreSuitable is set to True.

At block 210, the sleep management module 114 may determine if the current guardian is less suitable than the specified threshold number of current guardians. This may be determined based on the acknowledgement messages received. If the number of acknowledgment messages specifying that the new guardian is more suitable than the original guardian, the original guardian is less suitable. If the current guardian is less suitable, at block 212, the current guardian stops being a guardian. In one embodiment, stopping being a guarding involves enabling the sleep inactivity timer. This may involve canceling a request to disable the sleep inactivity timer.

It is useful to speed up convergence of the nodes' collective knowledge of each other's suitability. This lessens the time when there are no extra nodes acting as guardians. One way to achieve this is to piggyback suitability information in messages sent according to the method 200. For instance, the acknowledgement message can include the sender's suitability. Another, orthogonal way to achieve suitability stability is to lessen the frequency of suitability changes.

Define a machine to be held awake if either (a) its idle timer will not go off for the next v, or (b) the node 102 has an active power request keeping the node 102 awake. Define a machine's current suitability to be a guardian as 1 if it has been held awake for the last u and 0 otherwise.

This suitability value changes with a long-term rate that does not exceed 2/u. This is due to suitability only having two values, so it only transitions between 0 and 1. Consider two consecutive 1-to-0 transitions, happening at t1 and t3, with an intermediate 0-to-1 transition happening at t2. Just before time t1, the node 102 had been held awake for u, but just after t1 it had not. Therefore, it was not held awake at t1. At t2, it had been held awake for the last u, so t1 cannot have been in the last u. Therefore, t2>t1+u. The next transition, at t3, takes place after t2 and thus t3>t1+u. Thus, every two consecutive 1-0 transitions are at least u apart. Since exactly two transitions happen for every 1-0 transition, the rate of transitions is at most two per u, or 2/u.

If the nodes 102 do not agree on the same set of BestServers, the nodes 102 may make extra nodes 102 into guardians, which wastes resources. Generally, as long as the convergence is sped up, as specified above, the nodes 102 may generally agree on the set of nodes 102 to make guardians because the candidates are periodically broadcasting their respective suitabilities and they rarely change. However, in cases when there are not sufficient nodes 102 awake, and one or more is to be woken, guardians do not have recent suitability estimates from those machines. Such nodes 102 may be assumed to have a suitability of zero. Ties resulting from comparing the suitability scores may be decided by a hash of machine ID for the nodes 102, and the current date.

One problem with this approach is that the same servers may be repeatedly selected to wake up, and some of them might be failed. Failed nodes are nodes that have been decommissioned or removed from the network. In such a scenario, new nodes 102 may be selected instead of the failed nodes. In one embodiment, each node 102 keeps track of failed attempts to wake each particular node 102.

Thus, when a guardian attempts to wake another node 102, but a long time goes by without the node 102 responding to repeated BecomeGuardian messages, the guardian increments a "failure evidence" count for that node 102. When it is time to choose the most suitable nodes 102 to wake, the guardian chooses the one with the lowest hash among those with the lowest "failure evidence" count. At roll call time, each node 102 clears all its "failure evidence" counts.

If a node 102 is incapable of being a server, the node may have an effective suitability of −∞. This can happen if the node 102 crashes, if the node 102 is configured to act as a client only, or if a driver that the node 102 relies on is not working. For instance, if the driver that is used for sending wake-on-LAN packets is not working, the node 102 is not eligible to be a guardian.

As stated previously, when a manager is managing another sleeping node, the manager is monitoring traffic to the sleeping node to determine when to wake the sleeping node up. Nearly all of this monitored traffic is coming from other nodes 102. However, in some cases, the manager itself may send traffic to the sleeping node. In such cases, the sleep management module 114 may use custom routes to allow the manager to monitor its own traffic to the sleeping node without having to monitor its own outbound traffic. In this way, the sleep management module 114 ensures such outbound traffic is seen as inbound traffic to the manager.

Figure 3:
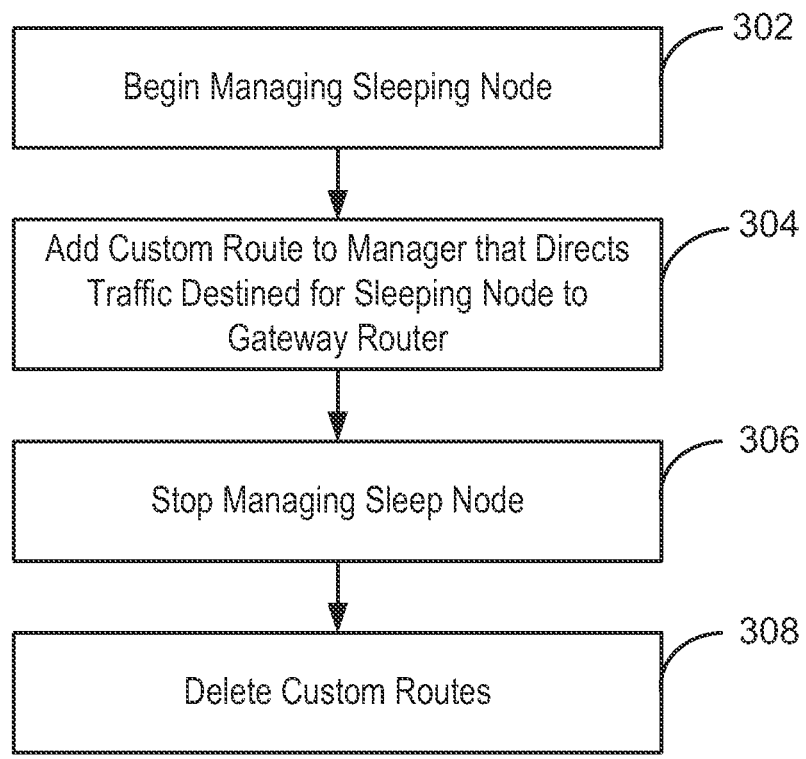
FIG. 3 is a process flow diagram of a method for managing a sleeping node in accordance with the claimed subject matter.

FIG. 3 is a process flow diagram of a method 300 for managing a sleeping node in accordance with the claimed subject matter. It should be understood that the process flow diagram is not intended to indicate a particular order of execution. The method 300 may be performed by the sleep management module 114.

The method 300 begins at block 302, where the sleep management module 114 begins managing a sleeping node. At block 304, the sleep management module 114 adds a custom route to the manager; this route directs traffic destined for the sleeping node to a gateway router 104.

For example, a manager, M, is managing a sleeping machine, Z, with IP addresses zip1, zip2, and zip3. The IP addresses may include IPv4 address and some IPv6 addresses. The manager's gateway router's IP address in this example is gip. The manager, M, adds custom routes that route zip1, zip2, and zip3 traffic to gip. As such, any traffic that M sends to Z gets routed through the gateway router 104. The gateway router 104 sends that traffic back to Z, and accordingly, the traffic ends up at M because M is monitoring Z's traffic. In this way, if a user on M tries to connect to a service on Z, the SYN request travels from M to the gateway router 104, then back to M. Even if M tells its traffic monitor to filter out all outbound traffic from M, it will still see this packet among the inbound traffic, sourced by the gateway router's MAC and destined for Z. The manager, M, may then process it just like a SYN from any other machine to Z, and wake up Z if appropriate.

Using custom routes, traffic sourced by M's address may be dropped by removing at least half of the parsing burden from the manager's network monitor. The sleep management module 114 removes much of this burden because the manager, M, can safely ignore any traffic with a destination MAC equal its own MAC. The manager, M, can also ignore a lot of traffic with a broadcast destination. Further, through the use of custom routes, the manager is relieved of the burden of monitoring outbound traffic, eliminating most of the remaining parsing burden.

At block 306, the manager stops managing the sleeping node. The manager stops managing sleeping nodes once they are awake. At block 308, the sleep management module 114 may delete the custom routes from the manager. The route deletes may be performed expressly. Alternately, because the custom route additions are temporary, they may be cleared on reboot. It is noted that if the routes are not deleted, traffic to Z still gets through to Z with an extra hop through the gateway.

Figure 4:
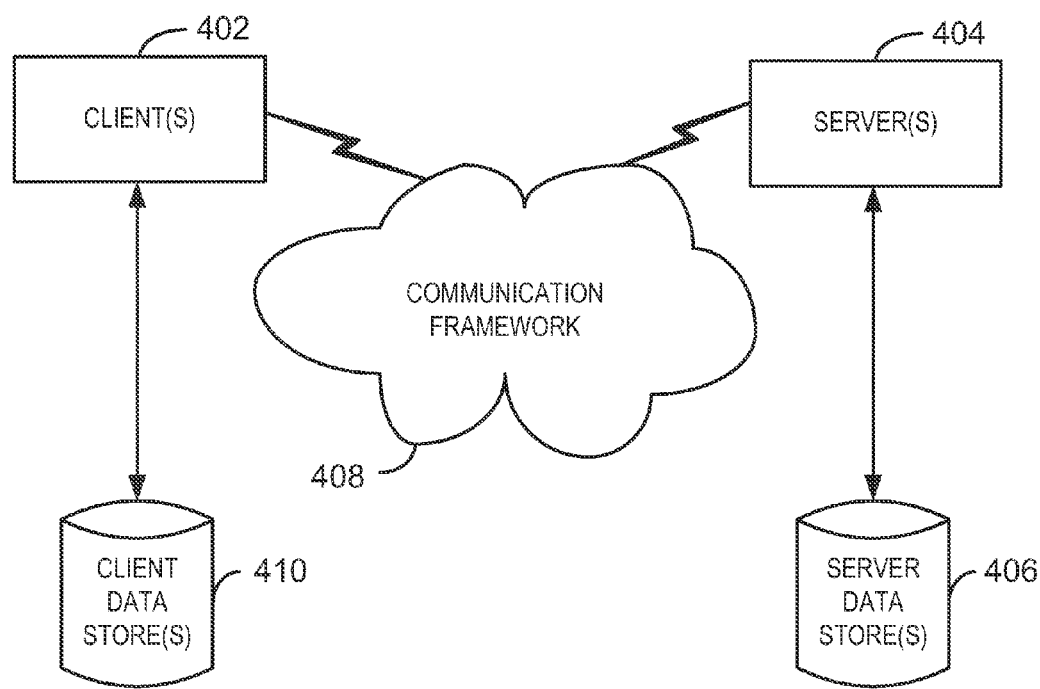
FIG. 4 is a block diagram of an exemplary networking environment wherein aspects of the claimed subject matter can be employed.

FIG. 4 is a block diagram of an exemplary networking environment 400 wherein aspects of the claimed subject matter can be employed. The networking environment 400 includes one or more client(s) 402. The client(s) 402 can be hardware and/or software (e.g., threads, processes, computing devices). The networking environment 400 also includes one or more server(s) 404. The server(s) 404 can be hardware and/or software (e.g., threads, processes, computing devices). The servers 404 can house threads to provide a sleep management service by employing the subject innovation, for example.

One possible communication between a client 402 and a server 404 can be in the form of a data packet adapted to be transmitted between two or more computer processes. The networking environment 400 includes a communication framework 408 that can be employed to facilitate communications between the client(s) 402 and the server(s) 404. The client(s) 402 are operably connected to one or more client data store(s) 410 that can be employed to store information local to the client(s) 402. The client data store(s) 410 do not have to be in the client(s) 402, but may be located remotely, such as in a cloud server. Similarly, the server(s) 404 are operably connected to one or more server data store(s) 406 that can be employed to store information local to the servers 404. As an example, the client(s) 402 may be computers requesting cloud services provided by the server(s) 404.

Figure 5:
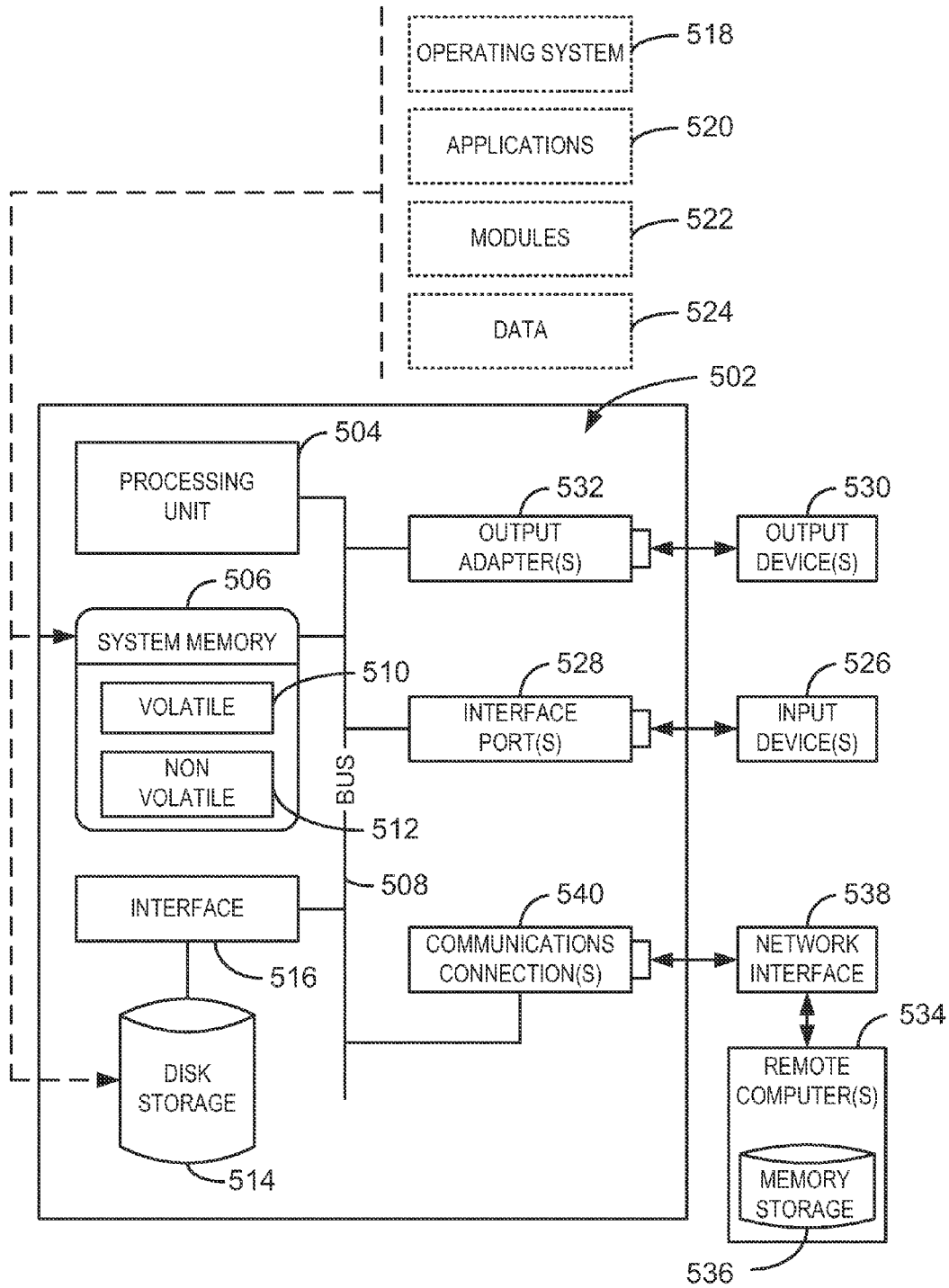
FIG. 5 is a block diagram of an exemplary operating environment that can be employed in accordance with the claimed subject matter.

With reference to FIG. 5, an exemplary operating environment 500 for implementing various aspects of the claimed subject matter includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art.

The system memory 516 is computer-readable media that includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other computer-readable media, such as removable/non-removable, volatile/non-volatile computer storage media. FIG. 5 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512.

System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512, and to output information from computer 512 to an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting a cloud service in a networked environment using logical connections to one or more remote computers, such as remote computer(s) 544. The remote computer(s) 544 may be client systems configured with web browsers, PC applications, mobile phone applications, and the like, to allow users to request cloud services, as discussed herein. The remote computer(s) 544 can be a personal computer, a server, a router, a network PC, a workstation, a microprocessor based appliance, a mobile phone, a peer device or other common network node and the like, and typically includes many or all of the elements described relative to the computer 512. For purposes of brevity, only a memory storage device 546 is illustrated with remote computer(s) 544. Remote computer(s) 544 is logically connected to the computer 512 through a network interface 548 and then physically connected via a communication connection 550.

Network interface 548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary embodiment of the computer 512 may comprise a server providing cloud services. The server may be configured to provide a sleep management service as described herein. An exemplary processing unit 514 for the server may be a computing cluster comprising Intel® Xeon CPUs. The disk storage 524 may comprise an enterprise data storage system, for example, holding thousands of impressions. Exemplary embodiments of the subject innovation may automatically determine servers to use for managing other servers.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for operating a sleep management service, comprising:
   identifying a set of guardians based on a local state for each of a plurality of compute nodes in a subnet;
   sending a wake request to all sleeping compute nodes in the identified set;
   sending a request to become a guardian to all compute nodes in the identified set; and
   stopping a current guardian from being a guardian if the current guardian is less suitable regarding capability than a threshold number of current guardians;
   managing a sleeping compute node on the subnet;
   adding a custom route to a manager of the sleeping compute node;
   directing traffic destined for the sleeping compute node to a gateway router using the custom route; and
   receiving traffic sent from the manager to the sleeping compute node at the manager.

2. The method of claim 1, comprising:
   receiving the request to become a guardian from one or more other proxies; and
   becoming a guardian by disabling a local inactivity timer of a compute node in the identified set.

3. The method of claim 1, wherein the set of guardians is identified based on a specified threshold for a number of guardians.

4. The method of claim 1, wherein the current guardian comprises an idle compute node, and wherein a selected set of suitable guardians comprises a compute node that is playing media.

5. The method of claim 1, comprising:
   receiving an acknowledgement message from each of the identified set of guardians; and
   determining that the current guardian is less suitable than a threshold number of current guardians based on the acknowledgement message.

6. The method of claim 5, wherein the acknowledgement message comprises a suitability score for a compute node sending the acknowledgment message.

7. The method of claim 6, wherein a suitability score associated with the current guardian is less than the suitability score for the compute node sending the acknowledgement message.

8. The method of claim 1, wherein the custom route comprises:
   an internet protocol (IP) address for the sleeping compute node; and
   an IP address for the gateway router.

9. The method of claim 8, comprising receiving traffic sent from the manager to the sleeping compute node at the manager.

10. The method of claim 9, comprising:
    stopping management of the sleeping compute node; and
    deleting the custom route.

11. A system for operating a sleep management service, comprising:
    a processing unit; and
    a system memory, wherein the system memory comprises code configured to direct the processing unit to:
    identify a set of guardians based on a local state for each of a plurality of compute nodes in a subnet;
    send a wake request to all sleeping compute nodes in the identified set;
    send a request to become a guardian to all compute nodes in the identified set;
    stop a current guardian from being a guardian if the current guardian is less suitable than a threshold number of current guardians;
    manage a sleeping compute node on a subnet comprising multiple compute nodes;
    add a custom route to a manager of the sleeping compute node;
    direct traffic destined for the sleeping compute node to a gateway router using the custom route; and
    receive traffic sent from the manager to the sleeping compute node at the manager.

12. The system of claim 11, comprising:
    stopping management of the sleeping compute node; and
    deleting the custom route.

13. The system of claim 12, wherein deleting the custom route is performed by rebooting the manager.

14. A computer-readable storage device, comprising code configured to direct a processing unit to:
    identify a set of guardians based on a local state for each of a plurality of compute nodes in a subnet;
    send a wake request to all sleeping compute nodes in the identified set;
    send a request to become a guardian to all compute nodes in the identified set;
    stop a current guardian from being a guardian if the current guardian is less suitable regarding capability than a threshold number of current guardians;
    manage a sleeping compute node on the subnet;
    add a custom route to a manager of the sleeping compute node;
    direct traffic destined for the sleeping compute node to a gateway router using the custom route; and
    receive traffic sent from the manager to the sleeping compute node at the manager.

15. The computer-readable storage device of claim 14, wherein the set of guardians is identified based on a specified threshold for a number of guardians.

16. The computer-readable storage device of claim 14, wherein the current guardian comprises an idle compute node, and wherein the identified set of guardians comprises a compute node that is playing media.

17. The computer-readable storage device of claim 14, comprising code configured to direct the processing unit to:
    receive a request to become a guardian from one or more other proxies; and
    become a guardian by disabling the local inactivity timer.

18. The computer-readable storage device of claim 16, comprising code configured to direct the processing unit to:
    receive an acknowledgement message from each of the identified set of guardians; and
    determine that the current guardian is less suitable than a threshold number of current guardians based on the acknowledgement message.

19. The computer-readable storage device of claim 18, comprising code configured to direct the processing unit to receive, at the manager of the sleeping compute node, traffic sent from the manager of the sleeping compute node to the sleeping compute node.

\* \* \* \* \*